Figure 13:
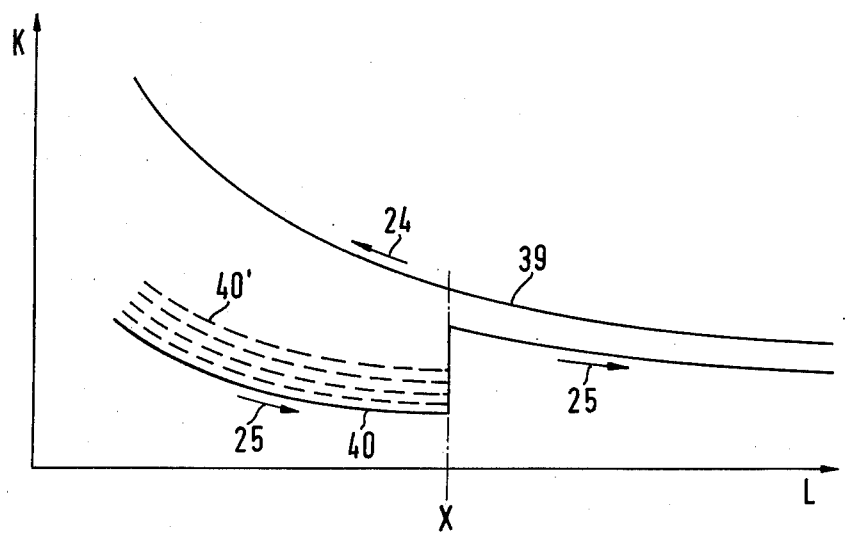

United States Patent [19]

Mögerlein et al.

[11] 4,084,764
[45] Apr. 18, 1978

[54] DEVICE FOR WINDING UP A BELT OR WEB

[75] Inventors: Heinrich Mögerlein; Werner Moser, both of Augsburg, Germany

[73] Assignee: Fa. J. N. Eberle & Cie. GmbH, Augsburg, Germany

[21] Appl. No.: 789,260

[22] Filed: Apr. 20, 1977

[30] Foreign Application Priority Data

| Apr. 28, 1976 | Germany | 2618714 |
| May 19, 1976 | Germany | 2622176 |
| Aug. 9, 1976 | Germany | 2635771 |
| Aug. 9, 1976 | Germany | 2635770 |

[51] Int. Cl.² ............ A65B 35/00; B65H 75/48
[52] U.S. Cl. ................ 242/107; 242/107.4 R
[58] Field of Search ............ 242/107–107.7; 297/388; 280/744–747

[56] References Cited

U.S. PATENT DOCUMENTS

| 3,957,222 | 5/1976 | Bladh | 242/107 |
| 3,957,283 | 5/1976 | Pocobello | 242/107 UR X |
| 4,002,219 | 1/1977 | Steinmann | 242/107 X |

Primary Examiner—Harvey C. Hornsby
Assistant Examiner—John M. Jillions
Attorney, Agent, or Firm—Karl F. Ross

[57] ABSTRACT

A dispenser for a retractable safety belt, to be used by the driver of a vehicle, comprises a holder in which a roller loaded by a retraction spring is journaled. The belt, anchored to the roller and partly wound around it, coacts with an insert in the form of a resilient ribbon which is coiled with the belt about the roller during at least an initial phase of a pull-out stroke and about a collateral axis alongside the belt during at least a final phase of that stroke of exert upon the belt a supplemental biasing force which either aids the force of the retraction spring in the initial phase or opposes it in the final phase. The changeover between the two phases can be brought about by a beginning windup of the free ribbon end, by a diversity of inherent stress in two longitudinally adjoining ribbon sections, or by a detent responsive to the coil diameter which holds the ribbon away from the belt in the final phase of pull-out and lets it rejoin the belt at an intermediate stage of the retraction step.

26 Claims, 19 Drawing Figures

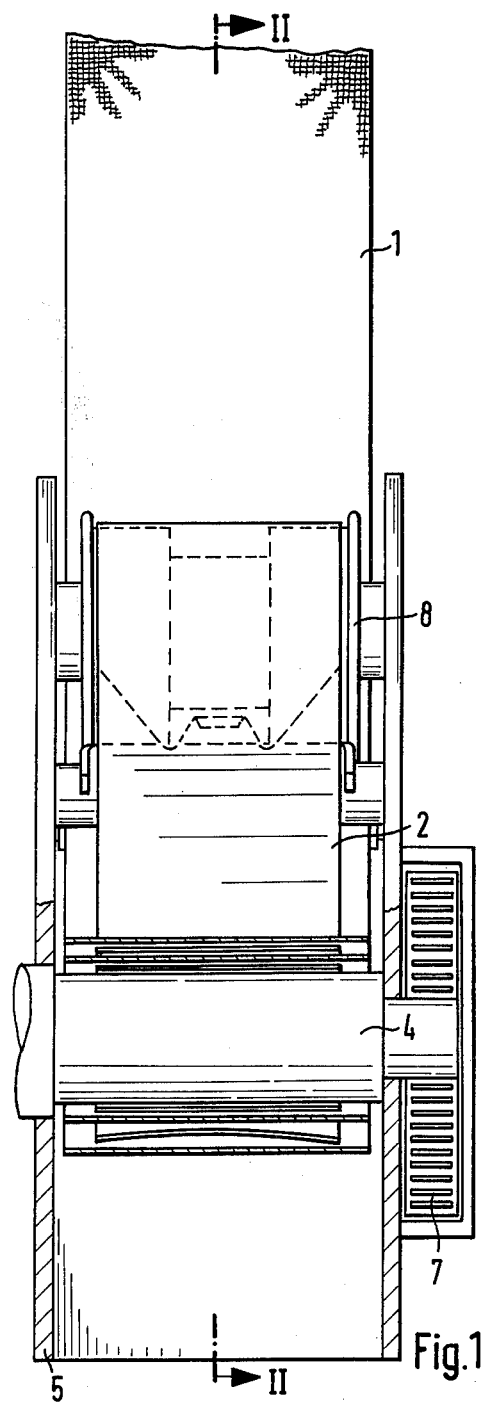
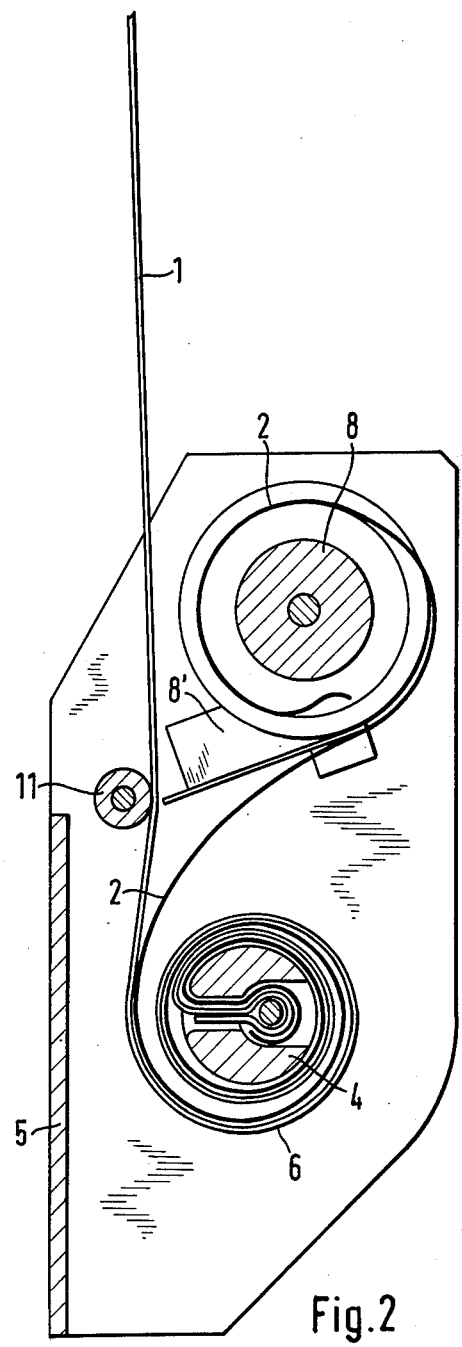
Fig.1
Fig.2

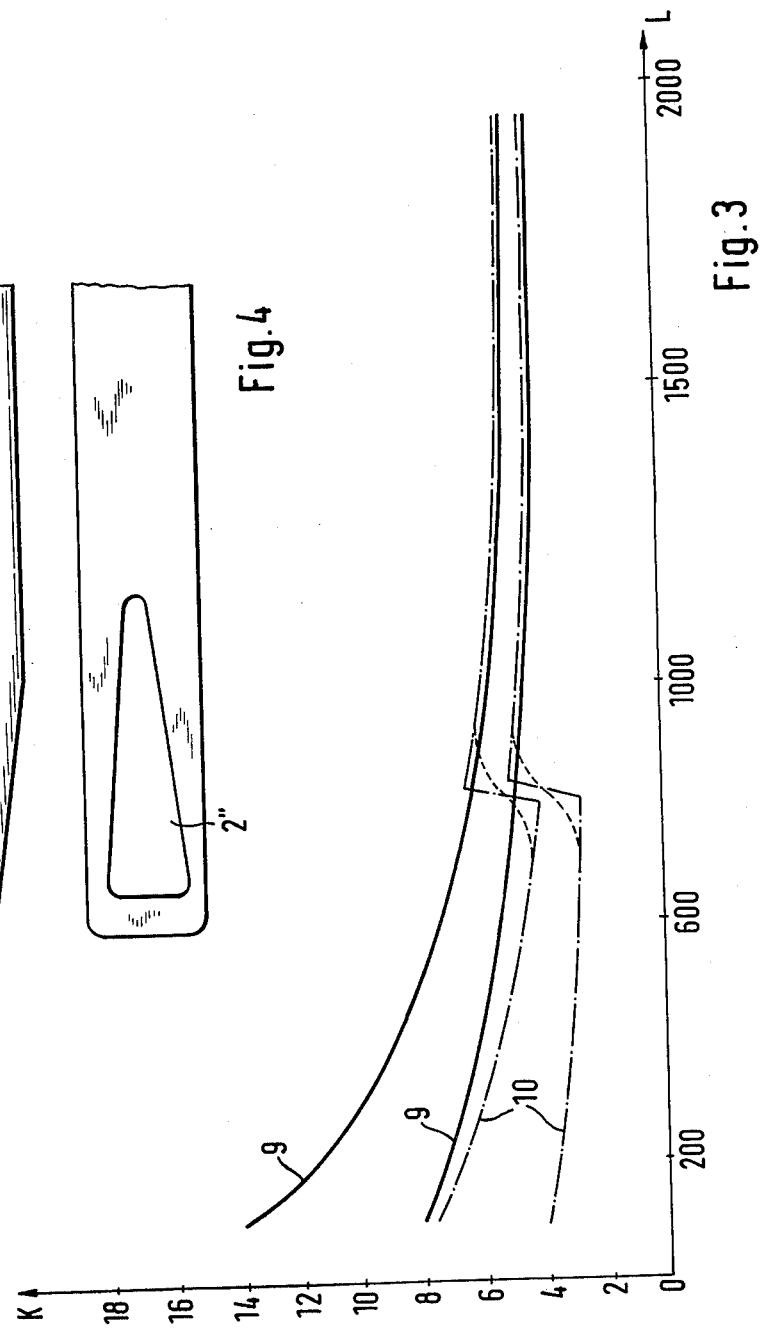

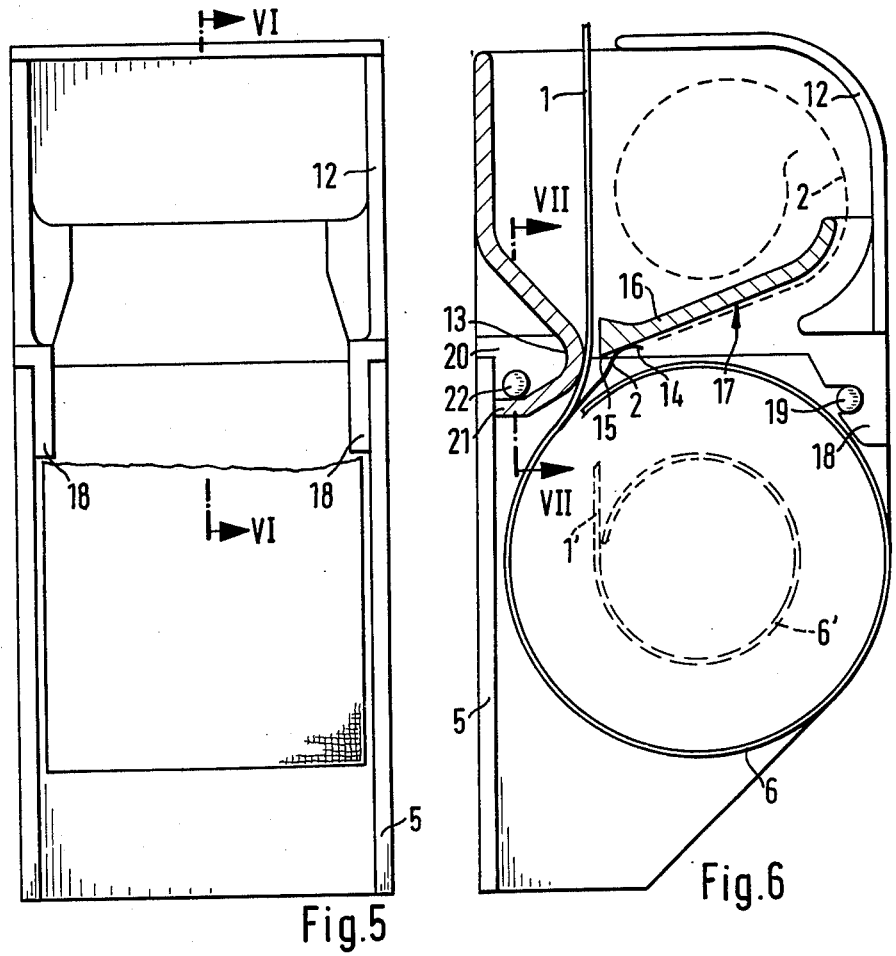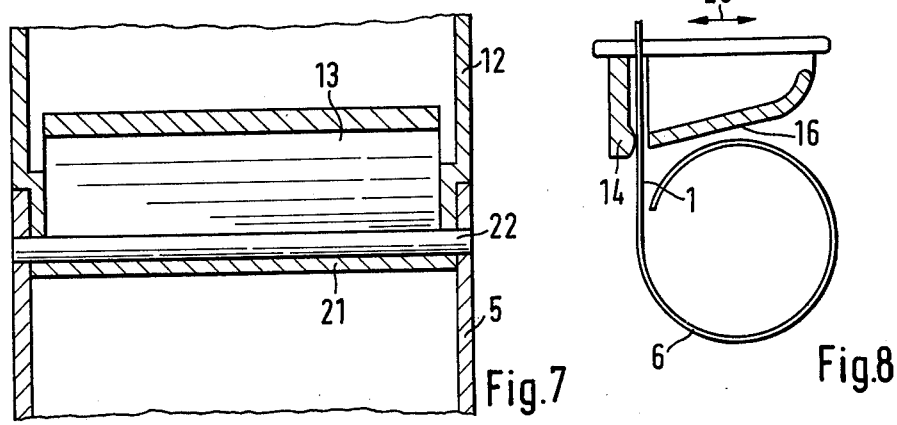

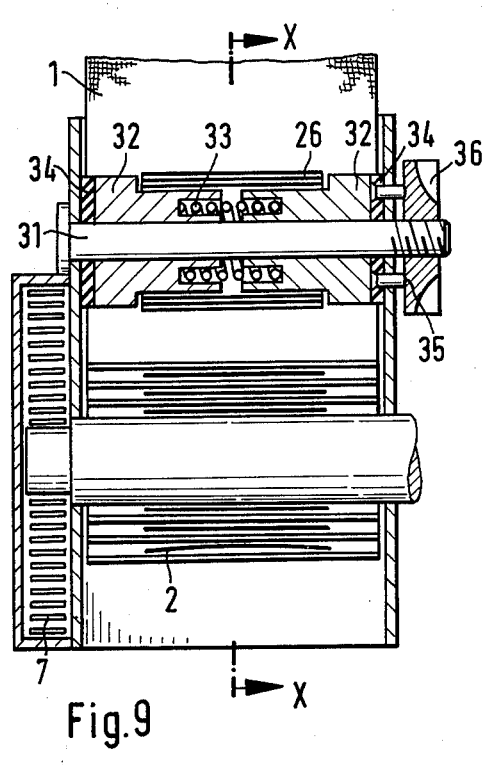
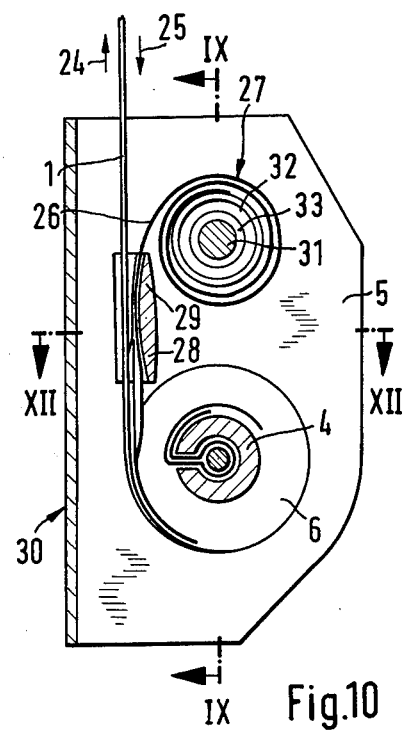
Fig.9
Fig.10
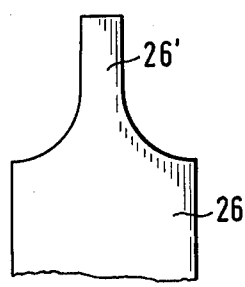
Fig.11
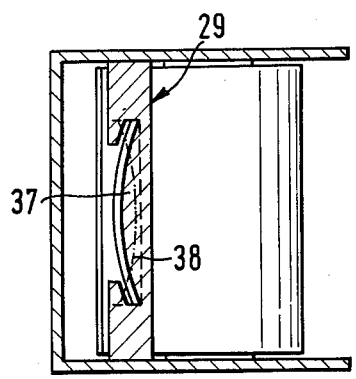
Fig.12

DEVICE FOR WINDING UP A BELT OR WEB

This invention relates to a device for winding up a belt or band, more specifically for an automatic safety belt for vehicles.

Such safety belts comprise in well-known manner, besides a winding-up device in which, by pulling the belt from a roller, a driving or retracting spring acting upon the roller is stretched, also a preferably automatic blocking device which in the event of sharp decelerations blocks the belt-winding roller and in the event of relatively slow movements of the driver releases the belt. This blocking device is not the subject matter of the present invention. It is therefore not explained and represented more particularly hereinafter. The invention, on the contrary, relates to the winding-up device, in which the belt can be wound up on a belt-winding roller, an additional spring element being provided which together with the belt can be wound up onto the belt-winding roller into a common coil with interleaved turns and acts upon the belt along with the driving spring in a partial area of the complete winding or pull-out area of the belt.

Such a device is already known from German printed specification 2,500,294. Therein a resilient ribbon-shaped insert is fastened to the belt strap so tht it rests against the latter and is wound up and pulled off the coil jointly therewith. This arrangement allows a reduction of the resulting tractive force on the belt in a certain range of the belt pull-out since the insert then opposes the force of the driving spring.

This known arrangement is, however, of little practical use because the reduction of the tractive force can be achieved only in a very short range of belt pull-out; this is because such an insert cannot be led over the guide devices provided for the belt. Its length is therefore very restricted. A reduction of tractive force in only a short range of belt pull-out, achieved with such an insert, is of no practical interest.

It is the object of the present invention to construct the winding-up device of the belt in such a way that, upon the pulling out of the belt, after an initial high belt force in the first pull-out range, where the full spring force is still effective, a low belt force is attained in the subsequent buckling-up range over a very great length of pull-out path until the belt is almost fully unwound.

The solution of this problem is achieved, according to the invention, in that the additional spring element is led away from the belt and wound up with its portion disposed outside the belt coils. On account of this solution according to the invention, the additional spring element can have any desired length because it can easily be stowed in the rolled-up state outside the coil and requires little space while acting on the belt. The effect according to the invention is further improved if the additional spring element is designed as a scroll which, on account of its curvature, can be easily rolled up.

Thus, in a particularly advantageous embodiment of the invention the additional spring element is designed as a scroll spring which is wound counter to its direction of curvature together with the belt upon the belt-winding roller, there being provided a guide device which grasps the free end of the scroll spring emerging together with the belt from the belt coil, by means of which the spring is led away from the belt and wound up outside the coil. Any desired length can be selected for the spring which is sufficient for the attainment of a low belt force in the entire buckling-up range of the belt, whereas after releasing the higher belt force becomes effective in the detachment range when only a short length of belt is pulled out.

Advantageously, with this embodiment, the free end of the scroll spring which emerges together with the belt from the coil is fully rolled into the coil at the beginning of the pull-out and in the first pull-out range (detachment range) of the belt. At this stage, the full tractive force of the driving spring is effective on the belt. If the scroll spring emerges from the coil, it immediately counteracts the driving spring so that the resulting tractive force on the belt decreases abruptly to a correspondingly lower value. Thanks to the invention, this reduced belt force can be maintained over any length of buckling-up range since the scroll spring emerging from the coil and rolled up by the guide device can be selected of a corresponding length.

Within the scope of the invention the curvature of the scroll spring can vary over the length of the strap, so that the transition from high to low belt force and vice versa takes place gradually and not abruptly. This variability over the strap length is possible not only for the longitudinal curvature but also for the transverse curvature, if such exists. Similarly, a desired course of the resulting belt force, especially a gradual transition from high to low tractive force, can be achieved if the cross-section of the strap, thus especially the width of the spring ribbon of the scroll spring, is varied in dependence upon the strap length.

In order to simplify the aforedescribed device and to reduce its structural height, the invention further provides that a hood or the like with at least one aperture for the belt is mounted on a housing receiving the belt coil, on the belt-exit side, in whose lower region facing the belt coil there is provided a wall element which has a deflecting edge or the like, extending immediately to the belt, for grasping and deviating the end of the spring, as well as a guide surface which directs the scroll-spring ribbon upwardly into the area above the wall element, and that sufficient free space is provided in the area of the hood above the wall element for a self-windup of the scroll spring. In this way the expenditure for a winding-up roller and its mounting can be eliminated. The height of the hood may then correspond only to about the diameter of the scroll spring which coils up automatically under its inherent stress.

Pursuant to a particular embodiment of the invention, owing to the shaping of the wall element and especially to the curvature of the guide surface of the same, the spring may be guided upwardly in such a way that an undisturbed self-windup of the spring is assured, i.e. that the spring during windup does not strike against the top of the wall element but nevertheless abuts tightly against the latter in the wound-up state. Other advantageous realizations of this hood with the wall element serving as a guide device follows from the attached drawing.

A particularly advantageous specific embodiment of the invention, in which a variably large and optionally adjustable retraction force in the buckling-up range of the belt — especially also after installation in a vehicle — can be individually selected, resides in that the scroll spring is wound in conformity with its direction of curvature onto the belt-winding roller, that the spring ribbon emerging together with the belt from the coil is wound around a roller which is mounted axially parallel to the belt-winding roller and is provided with a brake, and that a guide device such as a slider or the like is provided which grasps the strap end upon exit from the coil and leads it to the roller.

In the case of this spring construction according to the invention, the belt force during pull-out of the belt corresponds to the full force of the driving spring. The driver is constantly aware of the securing action of the belt. If, however, the belt is pulled out so far that the spring ribbon of the scroll spring is wound upon the roller, the retraction force is reduced according to the intensity of the roller braking upon a leaning back of the driver since with the pull-in of the belt the spring positions itself firmly around the braked roller and thus counteracts the tractive force of the driving spring. A variably large desired retraction force can be achieved depending upon the design or adjustment of the brake. By corresponding dimensioning of the length of the spring one ensures that after disengagement of the belt, when a part of the belt or the windable length of the belt is coiled up, the free end of the spring ribbon of the scroll spring is also pulled off the roller and wound with it into the belt coil. At this moment, the full unreduced tractive force of the stressed driving spring is again available, which is desirable for a rapid rolling up of the remaining length of the belt.

The spring brake according to the invention thus acts similarly to a freewheel. It can be used in all cases where a freewheel is required which need not go into effect precisely to the millimeter and where a stroke motion is converted into a rotary motion.

Within the scope of the invention various possibilities of realization of a brake device acting upon a roller are conceivable which are described hereinafter with reference to the drawing.

Part of the energy of the driving spring is destroyed in any of the aforedescribed arrangements by the additional spring element in order to obtain the desired effect, i.e. a changeover of the tractive force on the belt between a small value in the buckling-up range and a larger value in the detachment range. With the embodiment of the invention described hereafter, however, one ensures that only as much energy as is actually required both in the buckling-up range and in the detachemnt range has to be installed in any case.

This problem is solved in that the additional spring element, when a certain coil diameter is exceeded, e.g. when the belt is wound up half and more, is connectable to the belt coil with its force supplementing the tractive force of the driving spring. Thus, according to the invention, the spring element aids, as an additional spring, the effect of the driving spring in the detachment range whereas it is disconnected in the buckling-up range. In this way, only as much force as is necessary for the orderly functioning of the belt is expended in any instance. The total energy results from the addition of the two springs used, directed to the various operating phases. As the driving spring in the case of the invention no longer has to fulfill on its own the task of rolling up the belt, it can be constructed with a torque which, compared with before, is correspondingly smaller and which is just sufficient for the small forces in the buckling-up range, i.e. it can be designed thinner, in particular.

In a particular embodiment of the invention it is contemplated that the additional spring has the shape of a ribbon which is elastically prestressed at least over part of its length and is insertable into a housing located beside the belt coil, forming a spring store, and can be wound up against its longitudinal stress and stowed therein, that a device controlled by the coil diameter is provided by means of which, when the predetermined coil diameter is exceeded, the end of the prestressed ribbon or ribbon section emerging from the housing can be introduced into the gusset between belt and belt coil. The ribbon engaging in the belt coil with the belt roughly half rolled up assumes, as a result of its curvature produced by the longitudinal prestressing, a shape corresponding to the coil diameter or to the curvature of the respective coil circumference. Thereby the thrust force of the ribbon or ribbon section emerging from the spring store is converted into a rotary movement. The spring ribbon now aids the driving spring by its thrust and winds itself up together with the belt into a common coil onto the belt-winding roller.

Within the scope of the invention the prestressed ribbon of the additional spring is preferably transversely and longitudinally stressed over its stowable length. The length of the ribbon can be so dimensioned for safety's sake that, when the belt is fully wound up, a residual length of the prestressed ribbon or ribbon section of about two turns is still available in the spring store.

In a preferred embodiment of the invention, the device controlled by the coil diameter is formed by an unprestressed ribbon which together with the belt is wound up into a common coil onto the belt-winding roller and is fastened, for example, to the belt-winding roller, and whose end emerging from the belt is connected to the end of the prestressed ribbon emerging from the spring store. In this case it is particularly advantageous that the additional spring consists of a ribbon that is elastically prestressed only over part of its length, which is introduced into the housing and stowable therein, and that a further ribbon section is connected thereto which is not prestressed and is wound up together with the belt on the belt-winding roller. One thus deals with a single moving long ribbon, a part of which is prestressed and stowable in the spring housing, which then turns into an unstressed ribbon section that is constantly wound up together with the belt. It emerges partly from the belt coil in the buckling-up range but as a result of its shaping and lack of stress becomes neutral and serves exclusively as a means for leading the prestressed ribbon section into the store during the pull-out of the belt, thus during unwinding, and for withdrawing it therefrom and introducing it into the coil during the windup.

The transition of the stress distribution on the ribbon from the prestressed to the unprestressed part of the ribbon can also be made gradual with this embodiment so that the changing of the tractive force on the belt does not take place abruptly. In the area between the belt coil and the spring store there can be fixed a guide element which prevents disengagement of the spring ribbon, if this appears proper upon the selection of the ribbon cross-section. Within the scope of the invention there can be used for the ribbon itself, in this and the other aforedescribed embodiments, any suitable material, e.g. steel, but also a suitable synthetic resin, which is endowed or can be manufactured with the aforementioned states of stress.

Figure 14:
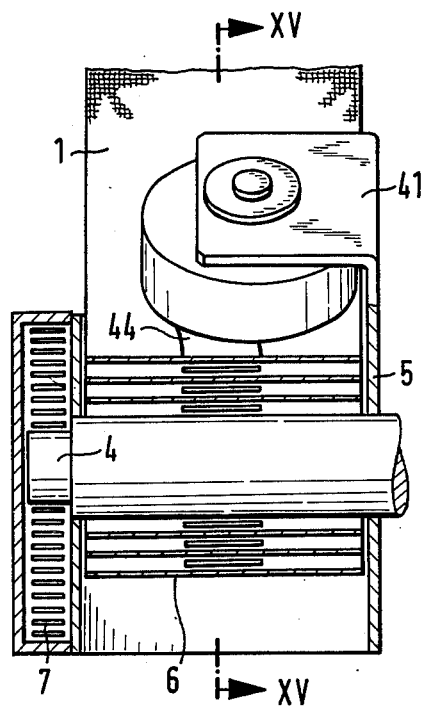
Figure 15:
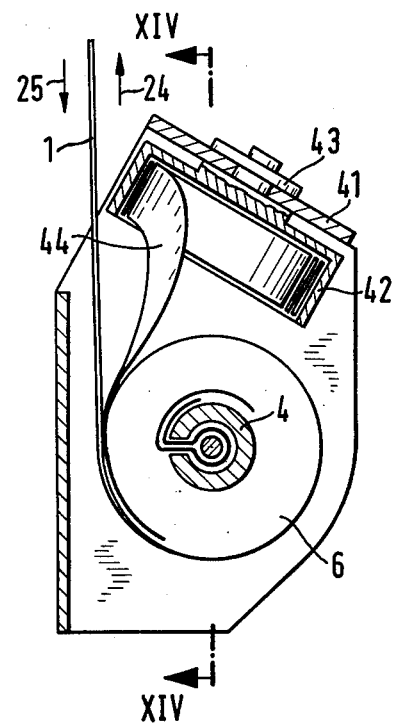
Figure 16:
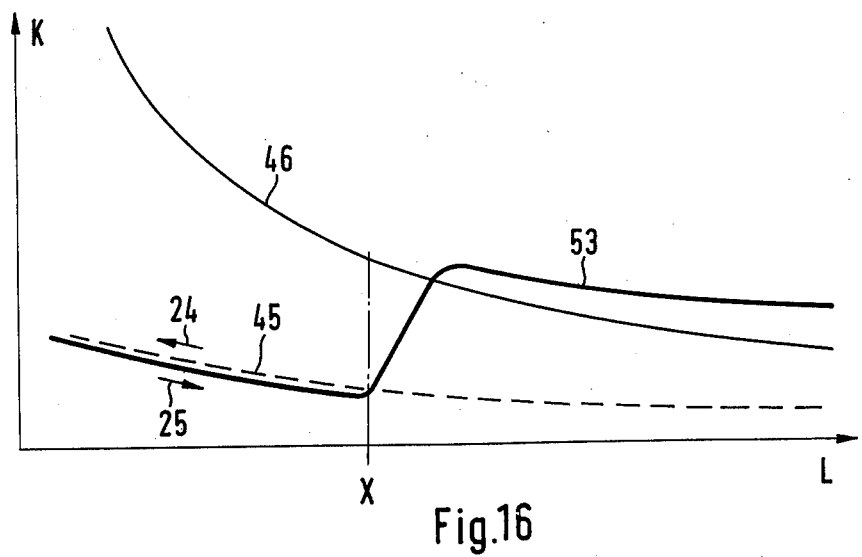
Figure 17:
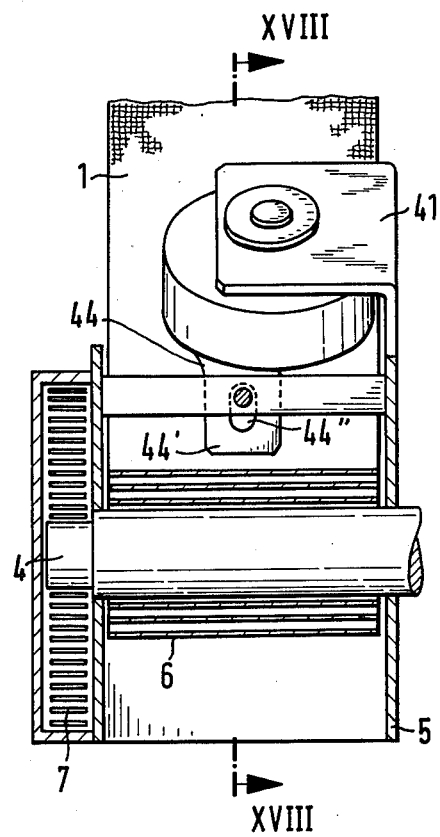
Figure 18:
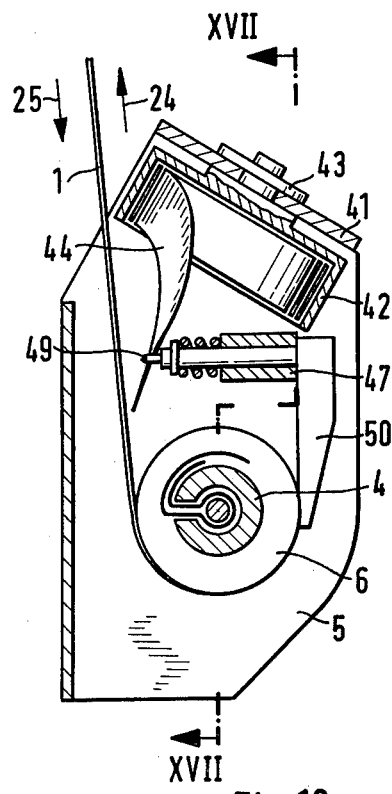

In another embodiment of the invention it is contemplated that the device controlled by the coil diameter is formed by a catch device which upon the pull-out of the belt engages with a latch or bolt, pressed elastically against the spring ribbon emerging from the belt coil, in a cutout in the spring ribbon provided shortly ahead of its end. As soon as the coil diameter falls below the predetermined value upon the pull-out of the belt and the end of the prestressed spring ribbon energes from the coil, it is grasped and retained by the catch device immediately above the gusset. Thereafter, only the tractive force of the driving spring is effective. Upon reversal of the direction of the belt, i.e. upon the windup of the belt, the ribbon is released on attainment of the predetermined coil-diameter value and, as a result of the thrust force of the stowed stressed spring ribbon, enters the gusset. A possible embodiment of a catch device is apparent from the drawing. Therein the invention is illustrated by way of example and schematically, with:

FIG. 1 showing a view of the windup device according to the invention, with a section through the belt coil;

FIG. 2 showing a section along the line II—II in FIG. 1;

FIG. 3 showing an example of the course of the tractive force in dependence upon the wound-up belt length;

FIG. 4 showing two examples of a change in the ribbon width at the beginning of the spring;

FIG. 5 showing a rear view of a hood provided on the belt housing or frame for receiving the scroll spring;

FIG. 6 showing a section along the line VI—VI in FIG. 5;

FIG. 7 showing a section along the line VII—VII in FIG. 6;

FIG. 8 showing a variant for FIG. 6;

FIG. 9 showing a section through the belt-winding roller in an embodiment with a braking roller along the line IX—IX in FIG. 10;

FIG. 10 showing a section along the line X—X in FIG. 9;

FIG. 11 showing a construction of the spring-ribbon end;

FIG. 12 showing a section along the line XII—XII in FIG. 10;

FIG. 13 showing a representation of the resulting spring characteristic of the embodiment according to FIGS. 9 and 10;

FIG. 14 showing a further embodiment of a winding device with a cut-open belt coil along line XV—XV in FIG. 15;

FIG. 15 showing a section along the line XVI—XVI in FIG. 14;

FIG. 16 showing a representation of the course of the characteristic curve of the tractive force of the belt;

FIGS. 17 and 18 showing a variant for FIGS. 14 and 15 with a catch device and

Figure 19:
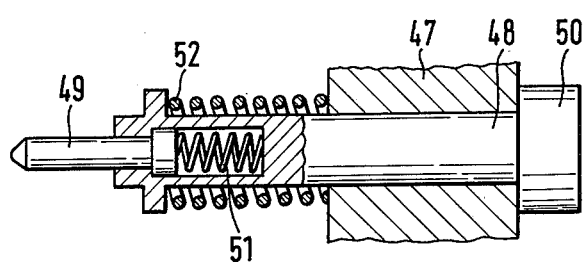

FIG. 19 showing an enlarged representation of a part of the catch device.

The embodiment according to FIGS. 1 and 2 shows a windup device which consists essentially of a belt-coil roller 4, journaled in a housing 5, on which the belt 1 is wound up and which the driving spring 7 engages in known manner. The blocking device which is customary with automatic safety belts is not illustrated since it is assumed to be known. A scroll spring 2 is wound, together with the belt 1, against its direction of curvature on the belt-winding roller 4. The part of the scroll spring 2 which emerges from coil 6 upon the pull-out of the belt 1 is grasped at its slightly bent-over front end by the forward edge of the guide device 8', runs along on the latter, and winds itself around the mandrel 8. A guide roller for the belt 1 is designated 11.

If the length and arrangement of the scroll spring 2 wound up with the belt 1 are so selected that the free end of the scroll spring emerging from the coil together with the belt 1 is still fully wound together with the belt into the coil at the beginning of the pull-out and during the first pull-out range, the effect of the scroll spring 2 is not yet felt at the beginning of the pull-out when the largest part of the belt is still wound up. In this range the course of the characteristic curve, i.e. the course of the tractive force in dependence upon the wound-up belt length, is still equal to that of the driving sring alone. At the instant, however, when the free end of the scroll spring emerges from the coil and then rests against the belt, from where it is grasped by the guide device 8' and is led around the mandrel 8, the effect of the scroll spring sets in. The characteristic curve exhibits from then on a low value since now the insert opposes the driving spring. This situation is represented in FIG. 3 where the course of the tractive force K in dependence upon the wound-up belt length L is represented without the scroll spring by the full-line characteristics 9 and with the scroll spring by the dot-dash characteristics 10. A low belt force is thus advantageously obtained here in the buckling-up range because of the scroll spring 2, whereas after disengagement the higher belt force becomes abruptly effective in the detachment range. The respective upper ones of the two curves 9 and 10 show the tractive force on the belt 1 during pull-out, the respective lower ones showing the force during retraction which is diminished by the frictional force.

Various modifications are possible within the scope of the invention. For example, not only the curvature of the scroll spring need vary over the length of the ribbon according to FIGS. 1 and 2. The width of the spring can also be variable. In order to attain, for example, a gradual steady transition from the low to the higher belt force (dotted part of the curves in FIG. 3), the ribbon width of the spring 2 can increase steadily from a small value at the beginning to the maximum width (top example in FIG. 4) so that it begins with a point 2'. Instead of this, a gradually decreasing cutout 2" can be provided at the beginning of the spring, according to the bottom example of FIG. 4. The concept underlying the invention, to lead the scroll spring or insert emerging from the coil away from the belt and wind it up, can thus be achieved in various ways.

FIGS. 5 to 8 show an advantageous guidance and accommodation of the scroll spring 2 emerging from the belt coil 6.

In the illustrated example the hood 12 is mounted on the top edge of the housing 5 receiving the belt coil 6. This is represented merely diagrammatically in its outlines since it is not subject matter of the invention. The hood 12 possesses a projecting nose 13 against which the belt 1 rests when it is pulled upwardly off the coil 6. The scroll spring 2, which is likewise wound up against its direction of curvature on the coil 6, strikes upon the withdrawal of belt 1 with its slightly bent-over end 14 against a deflecting edge 15 of a wall element 16 provided in the bottom area of the hood 12 and is thereby deviated away from the belt. Upon further pull-out, the spring ribbon is led along the guide surface 17 of the wall element 16 and is directed upwardly into the area above the wall element 16 where it unwinds of its own accord, as shown by the dashed line.

During assembly, the hood 12 is so mounted on the housing edge that it engages with its rear lateral lugs 18 behind a bolt 19 extending within the housing parallel to the coil axis and with its forward, flangelike projections 20 (FIG. 6) comes to rest on the housing edge. In this position, the lug 21 located at the bottom end of the nose 13 lies with its top surface on a level with the bottom surface of a bore in the sidewalls of the housing 5 through which a bolt 22 is then pushed. The hood 12 is thus locked on the housing 5 by the two bolts 19 and 22.

The position of the gap between the deflecting edge 15 and the nose 13 is advantageously so selected that in the pulled-out state of the belt, and therefore in the buckling-up position, the belt 1' extends about rectilinearly through the gap in the presence of a smaller coil 6'.

Finally, there is illustrated in FIG. 8 another variant in which the wall element 16, together with the nose 13 confronting its deflecting edge and forming a guiding lug, is mounted in lateral walls of the hood 12 so as to be displaceable transversely to the direction of the emerging belt, in accordance with arrow 23. Here, the belt always emerges tangentially to the coil 6.

An embodiment of the invention provided with a brake device is apparent from FIGS. 9 to 13.

The belt-winding roller 4 with the coil 6 disposed thereon is here journaled likewise in a frame or housing 5. By pulling out the belt 1 in the direction 24, the driving spring 7 is stressed and endeavors to retract the belt 1 again in the direction 25 and wind it up.

Together with the belt 1, a scroll spring 26 is wound onto the belt-winding roller 4 in conformity with its curvature. The free end of the spring ribbon of the scroll spring emerging from the coil 6 is wound around a roller 27 in the position shown in FIG. 9. The length of the spring 26 is so dimensioned that when the windable belt length $L_o$ is fully wound up, the ribbon has completely entered the belt and emerges from the coil only after withdrawal of a section $L_o - x$ of the extractable belt length. The free spring-ribbon end emerging from the coil is grasped by the deflecting edge 28 of the guide device 29 and is fed along the correspondingly shaped guide surface of the guide device 29 to the roller 27 around with it loops itself by virtue of its natural curvature. The complete assembly is fastened in the vehicle in known manner by the abutment surface 30 of the housing 5.

The roller 27 consists here of two cylinders 32 mounted on a shaft 31, which are forced apart by an interposed spring 33 and pressed with their end faces against the wall surfaces of the housing 5. Friction linings 34 are provided on these wall surfaces and on the end faces of the cylinders 32. A brake device 35 is mounted on one end of the shaft 31. Various braking values can be set by rotating its adjusting knob 36.

In the embodiment here represented, a scroll spring with supplementary transverse prestress is used.

In the interior of the guide device 29, therefore, a projecting boss 37 is provided which has a curved shape that is inverted with reference to the cross-sectional shape of the spring ribbon entering from below, indicated by a dot-dash line 38 in FIG. 12. Thereby, as already mentioned, the spring ribbon introduced from below in a rectilinear state is transformed into its spirally curved state.

In order to introduce the end 26' of the spring ribbon 26 more easily from below into the guide device 29, it is designed as a narrow rectilinear extension without any curvature (FIG. 11).

Upon the pull-out of the belt 1 in the direction 24 (FIG. 10), the scroll spring (apart from a slight friction) exerts no force on the belt. Merely the tractive force K of the driving spring 7, which gradually increases when the belt length L present on the coil becomes gradually smaller, acts upon the belt. (FIG. 13, curve 39.) If the belt is released, so that it is pulled back by the driving spring 7 in the direction 25 (FIG. 10), the scroll spring 26 counteracts the force of the driving spring 7 as long as it is still looped around the braked roller 27, i.e. as long as the belt length L wound up on the coil is smaller than X, so that the curve 40 in FIG. 13 is obtained as the characteristic for the retraction force. Depending upon the adjustment of the brake 35, curves 40' differing in the range L less than X can be obtained which correspond to a variably large retraction force adjustable as desired.

If L is larger than X, i.e. if the spring 26 is unwound from the roller 27, the force of the driving spring 7 acts again alone.

In the embodiment of FIGS. 14 to 19, the desired belt force is obtained by addition of the spring forces.

The belt-winding roller 4 is here also journaled, with the coil 6 thereon, in the belt-winding frame 5 which is fastened in the vehicle in known manner. By pulling out the belt 1 in the direction 24 (FIG. 15), the driving spring 7 is stressed and endeavors to retract the belt 1 in the direction 25 and to wind it up.

The spring housing 42 is rotatably mounted on a clip 41, bent over at the upper end of the belt-winding frame 5, and is fastened by means of the disk 43. A ribbon 44 of suitable spring steel is wound up in the spring housing 42 and stowed in it as seen in FIG. 15. The other part of the ribbon 44, not located in the housing 42, is wound up onto the belt-winding roller 4, together with the belt 1. The end of this part of the spring ribbon 44, located in the coil 6, is fastened to the belt-winding roller 4, the same as the belt.

A part of the ribbon 44, namely that which can be introduced into the housing 42 and is wound up therein, has a longitudinal and transverse stress and is wound up counter to its longitudinal stress in the housing. The remaining part of the ribbon 44, which together with the belt is wound into the coil 6, has no prestress and acts neutrally. As soon as the beginning of the prestressed ribbon part is pulled out of the housing 42 during the windup of the belt 1 (movement in the direction of arrow 25), the thrust force of the additional spring stowed and stressed in the housing 42 begins to act upon the coil 6 and aids the driving spring 7. Upon extraction of the belt (movement in the direction of the arrow 24), the ribbon 44 is pushed into the housing 42 while the diameter of the coil 6 gradually decreases. As soon as the prestressed part is pushed entirely into the housing 42 and only the stress-free ribbon part of the ribbon 44 emerges from the coil, the thrust force of the additional spring vanishes again.

FIG. 16 shows the course 53 of the tractive force on the belt in dependence upon the wound-up belt length L. If the wound-up belt length L is smaller than X, the tractive force is low. The prestressed part of the spring ribbon 44 is located entirely in the housing 42 and is not outwardly effective. If L is larger than X, a high tractive force prevails. The prestressed ribbon part has emerged from the housing 42 with progressively increasing belt-coil diameter during windup and exerts its thrust force on the belt coil 6, aiding the driving spring 7. Since, in this example, a gradual transition between the various stress states on the ribbon 44 is provided, the transition from the high tractive force to the low tractive force on the belt is not abrupt but steady. The dashed curve 45 shows the course of the tractive force of the driving spring 7 alone. The curve 46 shows the course of the tractive force of the driving spring with large spring force.

FIGS. 17 to 19 show an embodiment in which the spring ribbon 44 is controlled by a catch device, so that the stress-free part of the spring ribbon 44 wound in the aforedescribed embodiment into the belt coil 6 and fastened to the belt-winding roller 4 is omitted and the same consists merely of the prestressed ribbon part which is introduced into the housing 42 and is wound up therein counter to its longitudinal stress, i.e. the stressed ribbon part.

Here, the free end 8' of the prestressed ribbon 44 still projecting from the spring housing 42 is held by the catch device 47 to 52 in the illustrated state. The catch device engages with its point 49, which is mounted via the spring 51 in a shiftably mounted bolt 48, in a cutout 44" at the end 44' of the spring ribbon. Upon windup (movement in arrow direction 25) the bolt 48 is shifted via the arm 50 to the right in its mounting 47, against the force of the spring 52, with increasing diameter of the coil 6. When a certain coil diameter is reached, the spring-ribbon end 44' is released. As a result of the spring tension, the end 44' then penetrates into the gusset between belt 1 and coil 6, so that the aiding effect of the additional spring 44 ensues in the manner already described.

We claim:

1. A safety-belt dispenser comprising:
 a holder;
 a roller journaled in said holder;
 a belt anchored to said roller and partly wound therearound, said belt being unwindable from said roller along a predetermined path during a pull-out stroke;
 a driving spring mounted on said holder and coupled with said roller for exerting thereupon a restoring force tending to rewind said belt during a retraction stroke;
 a resilient ribbon at least partly interleaved with said belt about said roller in a rewound state of said belt, said ribbon being inherently stressed for superimposing a biasing force upon said restoring force during certain phases of said strokes to subject said belt to a rewinding force of relatively high value during an initial part and of a relatively low value during a terminal part of a pull-out stroke;
 retaining means disposed alongside said path for storing said ribbon in coiled form apart from said belt upon separation of said ribbon and said belt during said pull-out stroke; and
 guide means for directing said ribbon from said roller to said retaining means.

2. A dispenser as defined in claim 1 wherein said ribbon is a scroll spring with an inherent longitudinal stress biasing same in a predetermined winding direction.

3. A dispenser as defined in claim 2 wherein said scroll spring is interleaved with said belt and wound about said roller in said rewound state of said belt, said scroll spring having a leading end emerging from said coil and approaching said guide means at the end of said initial part of a pull-out stroke.

4. A dispenser as defined in claim 3 wherein said scroll spring is wound about said roller in a sense opposite said longitudinal stress, said guide means directing said leading end to said retaining means in a position enabling coiling of said scroll spring in a reverse sense.

5. A dispenser as defined in claim 3 wherein said scroll spring further has an inherent transverse stress whereby said leading end has a predetermined transverse curvature upon approaching said guide means, the latter forming a passage reversing said transverse curvature during said terminal part of said pull-out stroke with resulting reversal of the biasing effect of said longitudinal stress whereby said scroll spring tends to coil up in said retaining means in the sense in which it is wound about said roller.

6. A dispenser as defined in claim 3 wherein said scroll spring has a portion of progressively decreasing cross-section terminating substantially at said leading end thereof.

7. A dispenser as defined in claim 3 wherein said guide means forms a passage for said belt adjacent a deflecting edge positioned for engagement by said leading end.

8. A dispenser as defined in claim 7 wherein said passage is substantially aligned with an edge of said coil at least in a final phase of said pull-out stroke for letting said belt extend substantially tangentially therefrom.

9. A dispenser as defined in claim 8 wherein said guide means comprises an element movably mounted on said holder for keeping said belt substantially straight during each pull-out and retraction stroke.

10. A dispenser as defined in claim 3 wherein said leading end is substantially unstressed.

11. A dispenser as defined in claim 10 wherein said leading end is narrower than the remainder of said scroll spring.

12. A dispenser as defined in claim 2 wherein said retaining means comprises a shaft parallel to the axis of said roller, said scroll spring being partly coiled about said shaft at least in said extended state of said belt.

13. A dispenser as defined in claim 12 wherein said retaining means further comprises a mandrel on said shaft receiving said scroll spring in said extended state of said belt and brake means coacting with said mandrel for resisting unwinding of the said spring therefrom by said restoring force.

14. A dispenser as defined in claim 13 wherein said mandrel is axially divided into two halves, said brake means including a compression spring interposed between said halves.

15. A dispenser as defined in claim 14 wherein said shaft has a threaded extremity, said brake means further comprising a nut adjustably carried on said threaded extremity in contact with an extension of one of said halves.

16. A dispenser as defined in claim 2 wherein said retaining means comprises a housing mounted on said holder.

17. A dispenser as defined in claim 16 wherein said housing comprises a removable hood.

18. A dispenser as defined in claim 17 wherein said hood is unitary with said guide means and consists of synthetic resin.

19. A dispenser as defined in claim 17 wherein said hood and said holder are provided with coacting formations adapted to index said hood in a predetermined position relative to said housing.

20. A dispenser as defined in claim 16 wherein said scroll spring is almost fully withdrawn into said housing during said terminal part of said pull-out stroke, said guide means being formed by an entrance of said housing.

21. A dispenser as defined in claim 20 wherein said scroll spring is provided with an unstressed extension wound about said roller in interleaved relationship with said belt for entraining said scroll spring into said coil during said retraction stroke.

22. A dispenser as defined in claim 20 wherein said scroll spring has a trailing end separated from said coil in an unwound state of said belt, said scroll spring being inherently stressed to unwind from said housing and introduce said trailing end into said coil alongside said belt, further comprising detent means on said holder engageable with said trailing end in said unwound state of said belt for preventing the unwinding of said scroll spring until said belt has been partly rewound upon said roller.

23. A dispenser as defined in claim 22 wherein said detent means is provided with a feeler contacting said coil for disengaging said trailing end upon said coil reaching a predetermined minimum diameter during said retraction stroke and re-engaging said trailing end upon emergence thereof from said coil during said pull-out stroke.

24. A dispenser as defined in claim 23 wherein said detent means comprises a spring-loaded pin, said trailing end being provided with an aperture adapted to receive the tip of said pin.

25. A dispenser as defined in claim 20 wherein said scroll spring is of sufficient length to remain partly coiled up in said housing upon complete retraction of said belt.

26. A dispenser as defined in claim 20 wherein said housing is a cylindrical shell with an axis skew to that of said roller.

* * * * *